United States Patent [19]

Treybig et al.

[11] Patent Number: 4,724,003
[45] Date of Patent: Feb. 9, 1988

[54] ASPHALT COMPOSITIONS CONTAINING ANTI-STRIPPING ADDITIVES PREPARED FROM HYDROCARBYL SUBSTITUTED NITROGEN-CONTAINING AROMATIC HETEROCYCLIC COMPOUNDS, ALDEHYDES OR KETONES AND AMINES

[75] Inventors: Duane S. Treybig, Lake Jackson; Dane Chang, Houston, both of Tex.

[73] Assignee: The Dow Chemical Company, Midland, Mich.

[21] Appl. No.: 17,642

[22] Filed: Feb. 24, 1987

[51] Int. Cl.$^4$ ............................................. C08L 95/00
[52] U.S. Cl. ........................... 106/273 R; 106/273 N; 106/287.2
[58] Field of Search ............ 106/273 R, 273 N, 287.2

[56] References Cited

U.S. PATENT DOCUMENTS

| | | | |
|---|---|---|---|
| 2,482,586 | 9/1949 | Hersberger et al. | 106/273 |
| 2,550,476 | 4/1951 | Hersberger et al. | 106/273 |
| 2,759,840 | 8/1956 | Crews et al. | 106/273 |
| 2,759,841 | 8/1956 | Crews et al. | 106/273 |
| 2,766,132 | 10/1956 | Blair, Jr. et al. | 106/273 |
| 2,772,179 | 11/1956 | Kalinowski et al. | 106/273 |
| 2,901,372 | 8/1959 | Dybalski et al. | 106/273 |
| 2,919,204 | 12/1959 | Dybalski et al. | 106/269 |
| 2,937,106 | 5/1960 | Carpenter et al. | 106/273 |
| 3,259,512 | 7/1966 | Dickson et al. | 106/273 |
| 3,262,791 | 7/1966 | Dickson et al. | 106/14 |
| 3,317,447 | 5/1967 | Black et al. | 260/28.5 |
| 3,492,352 | 1/1970 | Miller, Jr. et al. | 260/570.8 |
| 3,502,723 | 3/1970 | Miller, Jr. et al. | 260/570.8 |
| 3,867,162 | 2/1975 | Elste, Jr. | 106/277 |
| 4,325,738 | 4/1982 | Plancher et al. | 106/273 |
| 4,430,465 | 2/1984 | Abbott | 524/64 |
| 4,515,708 | 5/1985 | Haselgrave et al. | 252/390 |

OTHER PUBLICATIONS

"The Function and Chemistry of Asphalt Compositions", Proc. AAPT., vol. 24, pp. 374–391.
"The Chemistry of Pyrazine and Its Derivatives, VII. The Synthesis of Vinylpyrazine and Substituted Vinylpyrazines", J. Org. Chem., vol. 27, p. 1363.
"Pyrazine, Quinoxaline and Tetrahydroquinoxaline Derivatives", J. Amer. Chem. Soc., vol. 76, pp. 4924–4925.
Co-pending application Ser. No. 757,830, filed 7-22-85.

Primary Examiner—A. Lionel Clingman
Assistant Examiner—Willie J. Thompson

[57] ABSTRACT

Asphalt compositions are improved by incorporating therein the reaction product of a hydrocarbyl substituted nitrogen-containing aromatic heterocyclic compound such as 2,4,6-trimethylpyridine, an aldehyde such as formaldehyde or ketone such as acetone and an amine such as a mixture of $C_{10}$–$C_{18}$ aliphatic monoamides.

18 Claims, No Drawings

ASPHALT COMPOSITIONS CONTAINING ANTI-STRIPPING ADDITIVES PREPARED FROM HYDROCARBYL SUBSTITUTED NITROGEN-CONTAINING AROMATIC HETEROCYCLIC COMPOUNDS, ALDEHYDES OR KETONES AND AMINES

BACKGROUND OF THE INVENTION

The use of petroleum residuum such as asphalt as a paving material and other construction material is well known. It is also well known that it is desirable to include in such compositions anti-stripping additives so as to reduce the tendency of the paving material which consists of the asphalt and an aggregate material from deteriorating during inclement weather conditions. During the winter months, the low temperatures tend to stiffen and reduce the flexibility of the asphalt binder in the paving material. Traffic loadings then cause the pavement to crack. When that happens, surface water can easily seep into the pavement. As the water goes through freeze-thaw cycles, it strips the asphalt from the aggregate surfaces, reduces the pavement's strength and accelerates deterioration. During the summer months, high temperatures can cause the asphalt pavement to become so soft that traffic can permanently deform the material and create shoving, rutting, bleeding and flushing problems. The incorporation of an anti-stripping additive into the asphalt composition employed in preparing the pavement increases the life of the pavement. It would be desirable to have anti-stripping additives for asphalt which improves its adhesion to the aggregate material.

SUMMARY OF THE INVENTION

The present invention pertains to a composition which comprises a blend of
(A) bituminous material and
(B) the product resulting from reacting
 (1) (a) at least one monoamine having a combined total of about 1 to 36 carbon, nitrogen, oxygen or sulfur atoms and at least one reactive amine hydrogen atom; (b) at least one polyamine having at least one reactive amine hydrogen atom; or (c) a mixture of (a) and (b);
 (2) at least one aromatic heterocyclic material having one or more rings, at least one nitrogen atom located in the ring and at least one substituent group which has at least one reactive hydrogen atom attached to a heterocyclic ring carbon atom; and
 (3) at least one aldehyde, ketone or combination thereof; and wherein the components are employed in quantities which provide a mole ratio of (1):(2):(3) of from about 0.25:1:0.25 to about 5:1:5, preferably from about 1:1:1 to about 2:1:2 and the reaction is conducted at a temperature of from about 25° C. to about 250° C., preferably from about 60° C. to about 200° C. for a time to essentially complete the reaction,
wherein components (A) and (B) are employed in quantities which provide from about 0.05 to about 10, preferably from about 0.25 to about 5, more preferably from about 0.5 to about 2.5, most preferably from about 0.5 to about 1 percent by weight of component (B) based upon the combined weight of components (A) and (B).

The present invention provides anti-stripping additives for asphalt which improves its adhesion to the aggregate material.

DETAILED DESCRIPTION OF THE INVENTION

The bituminous material employed herein in the practice of the present invention is not critical. Any bitumen, asphalt or crude residuum containing alphaltenes can be employed. U.S. Pat. No. 3,317,447 contains a good description of useful bituminous materials which are useful herein and is incorporated herein by reference. In general, the asphalts which can be employed include conventional petroleum asphalts, natural asphalts, gilsonite, air blown asphalts, coal tar and other similar materials. The asphalts are characterized by having penetration grades up to 300 decimillimeter at 77° F. as measured by ASTM Method D5. Preferred asphalts are the normal paving asphalts (e.g. AC5, AC10, AC20, and AC30. AC indicates asphalt cement and the number indicates the viscosity at 140° F. in poise divided by 100).

The anti-stripping compositions employed in this invention are preferably prepared by reacting an aldehyde or ketone with a mixture of an amine and a hydrocarbyl substituted nitrogen-containing aromatic heterocyclic compound. Preferably, the reaction is carried out in an inert atmosphere or under reduced pressure. The reaction can be carried out neat or in the presence of a solvent. A solvent, particularly water, is preferred. It is desirable to conduct the reaction in the presence of a catalyst. The preferred catalyst is hydrochloric acid. The hydrochloric acid neutralizes the amine thereby forming amine hydrochlorides. The quantity of (1) the amine, (2) hydrocarbyl substituted nitrogen-containing aromatic heterocyclic compound and (3) aldehyde or ketone employed should provide a mole ratio of (1):(2):(3) of from 0.25:1:0.25 to 5:1:5, suitably from 1:1:1 to about 2:1:2. The reaction of the aldehyde or ketone with a mixture of the amine and a hydrocarbyl substituted nitrogen-containing aromatic heterocyclic compound is carried out at a temperature between about 25° to about 250° C., preferably from 60° to 200° C. for a time to essentially complete the reaction, usually about 1-24 hours (3600-86,400 s), especially about 2-8 hours (7200-28,800 s). The aldehyde or ketone usually is added to a refluxing (100°-125° C.) aqueous solution of the amine and hydrocarbyl substituted nitrogen-containing aromatic heterocyclic compound at a slow rate in the course of 1-10 hours (3600-36,000 s), preferably 1-3 hours (3600-10,800 s). Solvent and reactants can be removed by distillation, sublimation or solvent extraction. The anti-stripping agent in the acid form (formed when employing an acid as a catalyst) can be neutralized with a base.

Examples of an inert atmosphere in which the reaction can be conducted includes nitrogen, helium, neon, xenon, argon mixtures thereof and the like.

Other suitable solvents besides water, include, any solvents in which the reactants and products are soluble such as alcohols, acids, amides, ethers and hydrocarbons. Particularly suitable solvents include, for example, ethanol, methanol, isopropanol, butanol, ethanediol, acetic acid, dioxane, tetrahydrofuran, dimethylformamide, toluene, xylene, combinations thereof and the like.

Suitable bases for neutralizing the anti-stripping agent in the acid form include sodium hydroxide, other hydroxides of alkali and alkaline earth metals, ammonium hydroxide, ammonia and the like. The inhibitor can be extracted with a solvent from the base during or after neutralization and/or salt formed during the neutralization. Suitable solvents for the extraction include chlorinated solvents, ethers and hydrocarbons and the like. Particularly suitable solvents include chloroform, diethyl ether, tetrahydrofuran, benzene, toluene, xylene, combinations thereof and the like.

Suitable aromatic heterocyclic materials having one or more rings, at least one nitrogen atom located in the ring and at least one substituent group which has at least one reactive hydrogen atom attached to a carbon atom which is attached to an aromatic heterocyclic ring which can be employed herein include, for example, pyrazines, pyridines, pyrazoles, imidazoles, pyridazines, pyrimidines, purines, pteridines, triazines, quinolines and quinoxalines. Particularly suitable such substituent groups include methyl, $-CH(R)_2$ or $-CH_2R$ groups wherein each R is independently a hydrocarbyl group containing from 1 to about 10, preferably from 1 to about 2 carbon atoms.

The hydrocarbyl substituted pyrazines, pyridines, purines, pyrazoles, imidazoles, pyridazines, pyrimidines, pteridines, triazines, quinolines, and quinoxalines employed herein are all aromatic compounds. The term aromatic as employed herein means that a compound must have a planar (lacking ring strain) molecule that contains cyclic clouds of delocalized pi ($\pi$) electrons located above and below the plane of the molecule; furthermore, the pi clouds must contain a total of (4n+2) electrons. This definition of aromatic is given in "Organic Chemistry", 2nd Ed. by R. T. Morrison and R. N. Boyd, Allyn and Bacon, Inc. 1970, pp. 317-318 which is incorporated herein by reference.

All pyrazines, pyridines, pyrazoles, imidazoles, pyridazines, pyrimidines, purines, pteridines, triazines, quinolines and quinoxalines are not necessarily aromatic compounds. For example, pyrazine hexahydride (piperazine), 5,6-dihydropyrazine, tetrahydropyrimidine and hexahydropyrimidine are not aromatic compounds since they are either non-planar, do not have a total of (4n+2) pi electrons or have a non-cyclic cloud of pi electrons. As a consequence, pyrazine hexahydride, 5,6-dihydropyrazine, tetrahydropyrimidine and hexahydropyrimidine are not pyrazines and pyrimidines of this invention.

The term heterocycle or heterocyclic as employed herein means that the ring must contain at least one nitrogen atom located in the ring. Although benzene and its substituted derivatives are aromatic they are not considered aromatics of this invention because they contain no nitrogen located in their ring. The nitrogen located in the aromatic ring is essential for activation of the hydrogen atom attached to the carbon atom of the substituent group attached to the carbon atom of the heterocyclic aromatic ring. The hydrogen atom attached to a carbon atom of a substituent group where the carbon atom is attached to a benzene ring is unreactive.

The term hydrocarbyl as employed herein means any aliphatic, cycloaliphatic, aromatic, aryl substituted aliphatic or aliphatic substituted aromatic groups.

Particularly suitable as the heterocyclic material which can be employed herein include the pyrazines such as, for example 2-methylpyrazine, 2,3-dimethylpyrazine, 2,5-dimethylpyrazine, 2,6-dimethylpyrazine, 2,3,5-trimethylpyrazine, 2,3,5,6-tetramethylpyrazine, 2-ethylpyrazine, 2-ethyl-3-methylpyrazine, 2-ethyl-5-methylpyrazine, 2-ethyl-6-methylpyrazine, 2-ethyl-3,5-dimethylpyrazine, 3-ethyl-2,5-dimethylpyrazine, 5-ethyl-2,3-dimethylpyrazine, 2-propylpyrazine, 2-methyl-3-propylpyrazine, 2-methyl-6-propylpyrazine, 2,5-dimethyl-3-propylpyrazine, 3,5-dimethyl-2-propylpyrazine, 2-(1-methylethyl)pyrazine, 2-methyl-3-(1-methylethyl)pyrazine, 2-methyl-5-(1-methylethyl)pyrazine, 6-methyl-2-(1-methylethyl)pyrazine, 2,3-diethylpyrazine, 2,3-diethyl-5-methylpyrazine, 3,5-diethyl-2-methylpyrazine, 2,6-diethyl-3,5-dimethylpyrazine, 2,5-diethyl-3,6-dimethylpyrazine, 2,5-bis(1-methylethyl)pyrazine, 2,5-dimethyl-3,6-bis(1-methylethyl)pyrazine, 2-butylpyrazine, 2-butyl-3-methylpyrazine, 2-butyl-6-methylpyrazine, 2-butyl-3,5-dimethylpyrazine, 3-butyl-2,5-dimethylpyrazine, 5-butyl-2,3-dimethylpyrazine, 2-butyl-3,5,6-trimethylpyrazine, 2,5-dibutyl-3,6-dimethylpyrazine, 2,5-dimethyl-3,6-bis(2-methylpropyl)pyrazine, 2,5-diethyl-3,6-bis(2-methylpropyl)pyrazine, 2-methyl-3-(2-methylpropyl)pyrazine, 2,3,5-trimethyl-6-(2-methylpropyl)pyrazine, 2-methyl-3-pentylpyrazine, 2-hexylpyrazine, 2-hexyl-3-methylpyrazine, 2,3,5-trimethyl-6-nitropyrazine, mixtures thereof and the like.

Particularly suitable pyridines which can be employed herein include, for example, 2-methylpyridine, 4-methylpyridine, 2-methyl-5-vinylpyridine, 2,3-dimethylpyridine, 2,4-dimethylpyridine, 2,5-dimethylpyridine, 2,6-dimethylpyridine, 2-ethylpyridine, 2,3,4-trimethylpyridine, 2,3,5-trimethylpyridine, 2,3,6-trimethylpyridine, 2,4,5-trimethylpyridine, 2,4,6-trimethylpyridine, 2-ethyl-3-methylpyridine, 2-ethyl-4-methylpyridine, 3-ethyl-2-methylpyridine, 3-ethyl-4-methylpyridine, 2-ethyl-6-methylpyridine, 5-ethyl-2-methylpyridine, 4-ethyl-2-methylpyridine, 2,4-diethylpyridine, 3,6-diethyl-2-methylpyridine, 2-ethyl-3,6-dimethylpyridine, 3-ethyl-2,6-dimethylpyridine, 4-ethyl-2,5-dimethylpyridine, 2-ethyl-4,6-dimethylpyridine, 2-methyl-4-propylpyridine, 2-methyl-4-(1-methylethyl)pyridine, 2-(1,1-dimethylethyl)-4-methylpyridine, 4-(1,1-dimethylethyl)-2-methylpyridine, 2,3-dimethyl-6-(1-methylethyl)pyridine, 3,6-dimethyl-2-(1-methylethyl)pyridine, 2,6-dimethyl-4-propylpyridine, 3,6-dimethyl-2-propylpyridine, 2-ethyl-3,4,6-trimethylpyridine, 3-ethyl-2,5,6-trimethylpyridine, 2-methyl-4-(1-methylpropyl)pyridine, 4-butyl-2-methylpyridine, 5-butyl-2-methylpyridine, 2,3,4,5-tetramethylpyridine, 2,3,4,6-tetramethylpyridine, 2,3,5,6-tetramethylpyridine, pentamethylpyridine, mixtures thereof and the like.

Other suitable aromatic nitrogen containing heterocycles which can be employed herein include, pyrazoles, imidazoles, pyridazines, pyrimidines, purines, pteridines, triazines, quinolines and quinoxalines having one or more substituents having a reactive hydrogen atom attached to a carbon atom which is attached to a heterocyclic ring. Such substituent groups include methyl, $-CH(R)_2$ or $-CH_2R$ wherein R is as above defined.

Suitable pyrazoles include 3-methylpyrazole, 4-methylpyrazole, 3,5-dimethylpyrazole, 1-ethyl-3,5-dimethylpyrazole, 3,4,5-trimethylpyrazole, mixtures thereof and the like.

Suitable imidazoles which can be employed herein include, for example, 2-methylimidazole, 4-methylimidazole, 1,2-dimethylimidazole, 2,5-dimethylimidazole, 2,4-dimethylimidazole, 2,4,5-trimethylimidazole, 2-ethyl-4-methylimidazole, mixtures thereof and the like.

Suitable pyridazines include, for example, 3-methylpyridazine, 3,5-dimethylpyridine, 3,4,5-trimethylpyridine, 3,4-tripropylpyridazine, mixtures thereof and the like.

Suitable pyrimidines include, for example, 4-methylpyrimidine, 2,4-dimethylpyrimidine, 4,5-dimethylpyrimidine, 4,6-dimethylpyrimidine, 2,6-dimethyl-4-pyrimidinol, 2,4,6-trimethylpyrimidine, 2,4-diethylpyrimidine, mixtures thereof and the like.

Suitable purines which can be employed herein include, for example, 6-methylpurine, 2,8-dimethylpurine, 2,6,8-trimethylpurine, mixtures thereof and the like.

Suitable pteridines include 6,7-dimethylpteridine, 2,6-dimethylpteridine, 2,4,7-trimethylpteridine, mixtures thereof and the like.

Suitable triazines which can be employed herein include 3,5-dimethyl-1,2,4-triazine, 3,6-dimethyl-1,2,4-triazine, 2,4-dimethyl-1,3,5-triazine, 2,4,6-trimethyl-1,3,5-triazine, mixtures thereof and the like.

Suitable quinolines include, for example, 2-methylquinoline, 4-methylquinoline, 2,4-dimethylquinoline, 2,6-dimethylquinoline, 2,7-dimethylquinoline, 8-ethyl-2-methylquinoline, 4-ethyl-2,3-dimethylquinoline, 8-ethyl-2,3-dimethylquinoline, 4-ethyl-2,3,8-trimethylquinoline, 4,8-diethyl-2,3-dimethylquinoline, 2,3-dimethyl-8-propylquinoline, 2,3,4-trimethyl-8-propylquinoline, 2,4-dimethyl-6-(1-methylpropyl)quinoline, mixtures thereof and the like.

Suitable quinoxalines include 2-methylquinoxaline, 2,5-dimethylquinoxaline, 2,3-dimethylquinoxaline, 2,6-dimethylquinoxaline, 2,3,6-trimethylquinoxaline, 2,3,6,8-tetramethylquinoxaline, mixtures thereof and the like.

The aromatic heterocyclic materials having one or more rings and at least one nitrogen atom located in the ring and at least one substituent group which has at least one reactive hydrogen atom attached to a carbon atom which is attached to an aromatic heterocyclic ring carbon atom can be mixed with each other. For example, 5-ethyl-2-methylpyridine can be mixed with 2-ethyl-3,5-dimethylpyrazine and used as the heterocyclic material in the present invention.

Suitable aldehydes and ketones which can be employed herein include, for example, all of those having the formula:

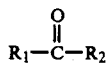

wherein each $R_1$ and $R_2$ are independently hydrogen, hydrocarbyl or substituted hydrocarbyl groups having from 1 to about 30 carbon atoms. Such substituents include, for example, halo, nitro, alkoxy and amino groups.

Particularly suitable aldehydes include, for example, formaldehyde, paraformaldehyde, acetaldehyde, 2-bromoacetaldehyde, benzaldehyde, propionaldehyde, butyraldehyde, caproaldehyde, crotonaldehyde, nicotinaldehyde, 2,2-dichloromalonaldehyde, gluteraldehyde, p-tolualdehyde, 3-chlorobenzaldehyde, naphthaldehyde, anthraldehyde, 2-furaldehyde, malonaldehyde, phthaldehyde, 3,5-dibromophthalaldehyde, 1-cyclohexene-1-carboxaldehyde, 3-quinolinecarboxaldehyde, 3-aminobenzaldehyde, combinations thereof and the like. Particularly suitable ketones include, for example, acetone, methyl ethyl ketone, 2-pentanone, 3-pentanone, 1-chloro-2-propanone, butyrone, 1-bromo-7-nitro-4-heptanone, acetophenone, 5,6,7,8-tetrahydro-1-isobutyronaphthone, capriphenone, 1-cyclohexyl-2-methyl-1-propanone, 1-(2-furyl)-1-butanone, 1-(5-quinolyl)-1-pentanone, 2-acetylchrysene, 4-bromobenzophenone, 2,4-pentanedione, 3,4-diacetyl-2,5-hexanedione, 3-cyclohexene-1-one, 2-acetonyl cyclohexanone, mixtures thereof and the like.

Suitable amines which can be employed herein include saturated and unsaturated aliphatic monoamines, cycloaliphatic monoamines or aromatic monoamines having a combined total of from about 1 to about 36 carbons, nitrogen, oxygen or sulfur atoms and at least one reactive amine hydrogen atom. Such amines include ethanamine, propanamine, butanamine, 3-buten-2-amine, N-hexyl-1-hexanamine, N-octyl-1-octanamine, N-nonyl-1-nonanamine (Di-n-nonylamine), isopropoxypropylamine, 3-(2-methoxyethoxy)propylamine, N-(3-ethoxypropyl)ethylamine, 4,4-diethoxybutylamine, cyclohexanebutylamine, cyclooctylamine, cyclododecylamine, N-methylcyclododedecylamine, octamethyleneimine, 4-hexyloxyaniline, 4-pentyloxyaniline, 1,4-benzodioxan-6-amine, 2-amino-4-tert-butylphenol, 2-biphenylamine, 4-biphenylamine, 2-aminonaphthalene, 2-fluoroenamine, 1-anthramine, 4-phenylbutylamine, 2-(benzyloxy)ethylamine, 2-(b-phenethylamino)ethanethiol, 4-amino-1-benzylpiperidine, tall oil amine, soya amine, hydrogenated tallow amine, tallow amine, $C_8$–$C_{15}$ ether amine, mixtures thereof and the like.

Particularly suitable monoamines include 1-hexanamine(hexylamine), 1-heptanamine, 1-octanamine, 1-nonanamine, 1-decanamine, 1-undecanamine, 1-dodecanamine (dodecylamine), 1-tridecanamine, 1-tetradecanamine, 1-pentadecanamine, 1-hexadecanamine, 1-heptadecanamine, 1-octadecanamine, N-methylhexanamine, N-methylheptanamine, N-methyl-1-decanamine, N-(1-methylethyl)-1-pentanamine, N-(1-methylethyl)-1-decanamine, N-methyl-1-octadecanamine, N-dodecyl-1-dodecanamine, 9-octadecen-1-amine, 9,12-octadecadien-1-amine, 9,12,15-octadecatrien-1-amine, 9-eicosen-1-amine, 11-eicosen-1-amine, mixtures thereof and the like.

Particularly suitable monoamines are the aliphatic primary amines having a combined total of from about 10 to about 20 carbon, nitrogen, oxygen or sulfur atoms or a mixture thereof.

Particularly suitable polyamines which can be employed in the preparation of the anti-stripping agents include, for example, those represented by the formulas

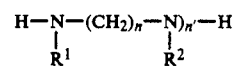

or

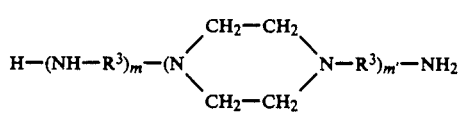

where each $R^1$ and $R^2$ is independently hydrogen or a hydrocarbyl group or hydroxyl substituted hydrocarbyl group or amine substituted hydrocarbyl group having from about 1 to about 36, preferably from about 1 to about 24, more preferably from about 1 to about 10, most preferably from about 1 to about 3, carbon atoms; each R3 is independently a divalent hydrocarbyl group having from 1 to about 36, preferably from about 1 to about 24, more preferably from about 1 to about 10, most preferably from about 1 to about 3, carbon atoms; m has a value from zero to about 8; m' has a value from 1 to about 4; n has a value of 2 to 20, preferably 2 to 3; n' has a value from 1 to about 10. The term hydrocarbyl as employed herein includes, alkyl, cycloalkyl, aryl, aralkyl, alkaryl, alkenyl and the like. Such amines include 1,2-ethanediamine, 1,2-propanediamine, 1,3-propanediamine, N-(2-aminoethyl)-1,2-ethanediamine, N-(3-aminopropyl)-1,3-propanediamine, N-(3-aminopropyl)-1,4-butanediamine, bis-(2-aminopropyl)amine, 1-piperazineethanamine, 2-(3-aminopropylamino)ethanol, 1-(2-aminoethylamino)-2-propanol, triethylenetetramine, tetraethylenepentamine, hexaethyleneheptamine, N,N-dibutyl-1,3-propanediamine, N,N'-dipropyl-1,7-heptanediamine, N,N'-dioctyl-1,2-ethanediamine, N,N'-dioctyl-1,3-propanediamine, N,N'-didecyl-1,3-propanediamine, N,N'-didecyl-1,3-propanediamine, 1,10-dodecanediamine, 1,12-dodecanediamine, N-decyl-1,2-ethanediamine, N-undecyl-1,2-ethanediamine, N-tridecyl-1,2-ethanediamine, N-pentadecyl-1,2-ethanediamine, N-hexadecyl-1,2-ethanediamine, N-heptadecyl-1,2-ethanediamine, N-octadecyl-1,2-ethanediamine, N-decyl-1,3-propanediamine, N-dodecyl-1,2-propanediamine, N-tetradecyl-1,3-propanediamine, N-hexadecyl-1,3-propanediamine, N-heptadecyl-1,3-propanediamine, N-octadecyl-1,2-propanediamine, N-octadecyl-1,3-propanediamine, N-octadecyl-1,4-butanediamine, mixtures thereof and the like. Other suitable polyamines which can be employed herein include, for example, 5,11-pentadecanediamine, 4,13-hexadecanediamine, 2,2,11-trimethyl-1,11-dodecanediamine, 5,13-diethyl-6,12-heptadecanediamine, 3,4-diethyl-4,13-hexadecanediamine, 12-ethyl-2-methyl-2-propyl-1,11-tetradecanediamine, 5,15-diethyl-5,14-nonadecanediamine, 6,9,12-trioxa-3,15-diazaheptadecane-1,17-diol, 3,6,9,12,15-pentaoxaheptadecane-1,17-diamine, N-[3-(decyloxy)propyl]-1,3-propanediamine, 1-[(2-aminoethyl)amino]-2-tetradecanol, 1-[(3-aminopropyl)amino]-2-dodecanol, 5-[(3-ethylamino)propyl]amino-1-pentanol, 1-piperazinepropanol, ether-1,3-propylenediamines, ether-1,2-ethylenediamines, mixtures thereof and the like.

The monoamines or polyamines can be partially alkoxylated such as partially ethoxylated, partially propoxylated, partially butoxylated or partially polyethoxylated, partially polypropoxylated or partially polybutoxylated, provided that there remains at least one amine hydrogen atom per molecule. Also suitable are the aminated polyols. Suitable such aminated polyols include, for example aminated ethylene glycol, aminated polyoxyethylene glycol, aminated propylene glycol, aminated polyoxypropylene glycol, aminated glycerine, aminated reaction products of ammonia or an amine such as methylamine, ethylamine, propylamine, butylamine, ethylenediamine, propylene diamine, diethylenetriamine or the like with an alkylene oxide such as ethylene oxide, propylene oxide, butylene oxide, mixture thereof and the like, aminated reaction products of trimethylol propane with an alkylene oxide such as ethylene oxide, propylene oxide, butylene oxide, mixtures thereof and the like. Suitable such aminated polyols include those disclosed in U.S. Pat. No. 4,374,222.

Suitable catalysts which can be employed include, for example, acids, Lewis acids, bases or salts. Particularly suitable acids include, for example, hydrohalides, sulfuric or glacial acetic acid. Suitable hydrohalides include, for example, hydrochlorides, hydrobromides, hydroiodides, combinations thereof and the like. Particularly suitable bases include, for example, alkoxides and hydroxides of alkali or alkaline earth metals, such as sodium ethoxide, magnesium ethoxide and sodium hydroxide. Particularly suitable Lewis acids include, for example, boron trifluoride and aluminum trichloride. Particularly suitable salts include, for example, zinc chloride. The use of such catalysts is not indispensable but it reduces the time required for the reaction. The preferred catalyst is hydrochloric acid. The catalyst can be reacted or complexed with the amine, the hydrocarbyl substituted nitrogen-containing aromatic heterocyclic material, a mixture of amine and hydrocarbyl substituted nitrogen-containing aromatic heterocyclic material and a mixture or reaction product of amine, hydrocarbyl substituted nitrogen-containing aromatic heterocyclic material and aldehyde or ketone.

The catalysts can be added to the reactants separately or to any one or combination of the reactants prior to contact with the remainder of the reactants.

The acid catalyzed reaction product of the hydrocarbyl substituted aromatic nitrogen heterocyclic material amine and aldehyde and/or ketone are believed to be those compounds or mixtures of compounds represented by the following formulas (II), (III), (IV), (V) or (VI):

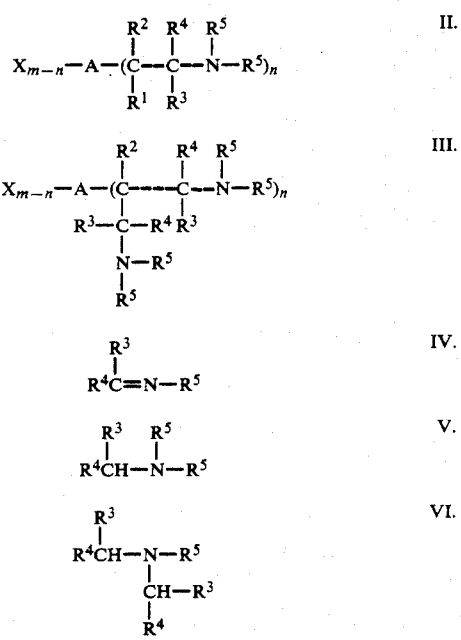

wherein $R^1$ and $R^2$ are independently hydrogen or a hydrocarbyl group containing 1 to about 10, preferably from 1 to about 2 carbon atoms; each $R^3$ and $R^4$ are independently hydrogen, hydrocarbyl or halo, nitro, alkoxy or amino substituted hydrocarbyl group having from 1 to about 30 carbon atoms; each $R^5$ is independently hydrogen, or a hydrocarbyl group having a combined total of from about 1 to about 36, preferably from about 10 to 20 carbons, nitrogen, oxygen or sulfur atoms; each X is independently hydrogen, methyl, —CH(R)$_2$ or —CH$_2$R groups wherein each R is independently a hydrocarbyl group containing from 1 to about 10, preferably from 1 to about 2 carbon atoms; A is either the pyrazine, pyridine, pyrazole, imidazole, pyridazine, pyrimidine, purine, pteridine, quinoline or quinoxaline nucleus; m has a value of 3 when A is a pyrazole, imidazole, purine or triazine, 4 when A is a pyrazine, pyridazine, pyrimidine or pteridine, 5 when A is pyridine, 6 when A is quinoxaline and 7 when A is quinoline; n has a value from 1 to m. The compound represented by formula III is only formed when $R^1$ of the substituent group of the aromatic nitrogen-containing heterocyclic compound is a hydrogen. Similarly, the compound represented by formula IV and VI are only formed when one of the two $R_5$ groups of the amine is a hydrogen.

In addition to the five compounds represented by formula II, III IV, V and VI, the reaction of the hydrocarbyl substituted aromatic nitrogen heterocyclic material, amine and aldehyde and/or ketone are believed to form a high molecular weight product or polymer of unknown composition. The presence of the high molecular weight product or polymer is suggested by gel permeation chromatography with tetrahydrofuran as the solvent. For example, some 2700 molecular weight material was found to be present in the reaction product of 2,4,6-trimethylpyridine, formaldehyde and Kemamine P-650. Molecular weight was based upon polystyrene standards.

Compounds II and III each have at least one

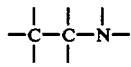

linkage. The

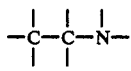

linkage results from the condensation of the amine and the hydrocarbyl substituted aromatic nitrogen containing heterocyclic material with the aldehyde and/or ketone under conditions sufficient to form a molecule of water. The two hydrogens of the water molecular are believed to originate from the reactive amine hydrogen of the amine and the reactive hydrogen atom attached to the carbon atom which is attached to the aromatic heterocyclic ring, respectively.

The asphalt compositions of the present invention can be blended with any of the aggregate materials known to the art in order to form pavement compositions.

The following examples are illustrative of the invention, but are not intended to limit the scope thereof in any manner.

EXAMPLE 1

51.44 grams (0.25 mole) of KEMAMINE ® P-650 (a mixture of $C_{10}$–$C_{18}$ primary amines commercially available from Witco Chemical Corp. which consists primarily of 1-decanamine, 1-dodecanamine, 1-tetradecanamine, 1-hexadecanamine, 1-octadecanamine and octadecene-1-amine) are added to a one-liter resin kettle equipped with a thermometer, mechanical stirrer, condenser, addition funnel and a nitrogen pad. The fatty amines are cooled to 19° C. and 100 milliliters of 37% hydrochloric acid are added in 54 minutes to form amine hydrochlorides. 40.2 grams of 2,4,6-trimethylpyridine (0.33 mole) are added while stirring over an 18 minute period. The temperature increased from 20° C. to 60° C. The mixture is heated to 108° C. and a nitrogen sweep is employed to aid in the removal of water via a Barrett Trap. The light yellow viscous material is heated to 127° C. at which point a minimal amount of water is collected. 97.55 grams (1.2 moles) of 37% aqueous formaldehyde are introduced dropwise via an addition funnel in 135 minutes. The temperature increased from 125° C. to 170° C. during the addition of formaldehyde. The reactants are then heated for an additional 75 minutes at 185° C. 299.1 grams of water soluble leather brown product is recovered.

EXAMPLE 2

51.44 grams (0.25 mole) of KEMAMINE ® P-650 and 13.3 grams (0.08 mole) of triethylenetetramine are weighed into a 250 milliliter 4-neck round bottom flask equipped with an immersion thermometer, mechanical stirrer, condenser and addition funnel. A nitrogen atmosphere is maintained throughout the reaction. 48.36 grams (0.49 mole) of 37% hydrochloric acid are added dropwise over an 18 minute period to the cooled and stirred amines. After 20.19 grams (0.17 mole) of 2,4,6-trimethylpyridine are added to the amine hydrochlorides, the reactor contents are heated to 107° C. and the resultant clear yellow liquid is allowed to reflux. 54.23 grams (0.67 mole) of 37% aqueous formaldehyde solution are added dropwise over 40 minutes giving a dark reddish brown liquid. After the reactants are heated for 4 hours between 98° C. and 100° C., a Barrett Trap is installed to remove water. The reactor contents are heated an additional 77 minutes between 98° C. and 182° C. On cooling to room temperature, the reactor contents are a dark reddish brown waxy solid.

EXAMPLE 3

66.64 grams (0.33 mole) of KEMAMINE ® P-650 are weighed into a reactor of the type described in Example 2. The fatty amines are stirred and cooled to 10° C. in a nitrogen atmosphere. 38.62 grams (0.39 mole) of 37% hydrochloric acid are added dropwise over a 33 minute period to form the fatty amine hydrochlorides. After 25.82 grams (0.16 mole) of 2,3-dimethylquinoxaline are added to the reactor contents, the reactants are heated to 103° C. and allowed to reflux. Then 52.31 grams (0.64 mole) of an aqueous 37% formaldehyde solution are added dropwise over a 110 minute period. After a Barrett Trap is installed to remove water, the reactor contents are heated between 100° C. and 125° C. for an additional 147 minutes. A black waxy solid that is soluble in ethanol and xylene is recovered as the final product. The black waxy solid is ground to a fine powder and rotary evaporated under full vacuum at 100° C. Ethanol is added to the black powder and the ethanol removed by rotary evaporation under full vacuum at 100° C. The infrared spectrum of the black waxy powder supported the presence of methylene group, amine salt, imine and quinoxaline. The presence of methylene groups is supported by absorption bands at 722 cm$^{-1}$, 1467 cm$^{-1}$, 2850 cm$^{-1}$ and 2925 cm$^{-1}$. A combination of medium intensity bands between 2000 cm$^{-1}$ and 2800 cm$^{-1}$ are explained by the presence of an amine salt. A broad band between 1640 cm$^{-1}$ and 1690 cm$^{-1}$ is assigned to the C=N stretch of an imine. Absorption bands at 765 cm$^{-1}$, 1197 cm$^{-1}$, 1205 cm$^{-1}$ and 1382 cm$^{-1}$ supported the presence of quinoxaline.

EXAMPLE 4

52.47 grams (0.26 mole) of KEMAMINE® P-650 are weighed into a reactor of the type described in Example 2. The fatty amines are stirred while cooled to 19° C. in a nitrogen atmosphere. 31.45 grams (0.32 mole) of 37% hydrochloric acid (0.32 mole) are added dropwise over a 14 minute period. After 31.6 grams (0.29 mole) of 2-methyl-5-vinylpyridine are added to the amine hydrochlorides, the reactor contents are heated to 99° C. 40.91 grams (0.5 mole) of 37% aqueous formaldehyde solution are added dropwise over 18 minute period giving a reddish brown liquid. After the reactants are heated for 200 minutes at 100° C., a Barrett Trap is installed to remove water. The reaction temperature is gradually increased from 100° C. to 186° C. over a period of 83 minutes. After cooling to room temperature, the reactor contents are a brown colored product.

EXAMPLE 5

The above prepared anti-stripping additives or agents are mixed with asphalt and the resultant blend is then mixed with an aggregate and subjected to a boil test and a freeze-thaw test. A description of the tests are as follows and the results are given in the Table. In these tests, AC-20 type asphalt obtained from Texas Cosden Oil & Chemical Co. is employed. Three siliceous aggregates which have shown signs of serious stripping problems are tested. The names and the origins and silicon contents of these aggregates are:

Gifford-Hill (Bryan, Tex., 100% Si)
Granite (California, 61% Si)
Helms (Nevada, 63% Si)

BOIL TEST

Preparation of Mixtures

In order to minimize the effect of aggregate interlock while maximizing the bond between the aggregate and the asphalt cement, each individual aggregate is first wet sieved to obtain the portion that passes No. 8 sieve and retained on No. 20 sieve (U.S. standard testing sieve series, ASTM E-11). Then 100 g of this size dry aggregate is heated to 160° C. plus or minus 3° C. for at least 2 hours. The asphalt cement (6 g) with 60 mg of anti-stripping additive is heated and stirred at 160° C. for 5 minutes (300 s). At the appropriate time, the hot dry aggregate is poured into the asphalt and mixed manually on a hot plate as rapidly and thoroughly as possible for 5 minutes. This mixture is then allowed to cool at room temperature for at least 2 hours before testing.

Test Procedure

A 1-liter beaker is filled with 500 ml deionized water and heated to boiling. The prepared aggregate-asphalt mixture is added to the boiling water which temporarily lowers the temperature below the boiling point. The heat is then increased so that the water reboiled in approximately 2 to 3 minutes. The water is maintained at the boiling temperature for 10 minutes while stirring with a glass rod at 3-minute intervals. During and after boiling, the stripped asphalt is skimmed away from the water surface with a paper towel to prevent recoating the aggregate. The mixture is then poured onto a paper towel and allowed to dry. The amount of asphalt retained on the mixture is determined by visual rating expressed in terms of percent of retained asphalt. To standardize this evaluation, a set of 10 sample mixtures representing a scale of from 0 to 100 percent asphalt retention is prepared. By referring to these standard mixtures, the percent of asphalt retained on the aggregate is determined. An additive is considered to pass the boil test when an aggregate retains more than 70% of the original quantity of the mixture of additive and asphalt previously coated onto the aggregate.

FREEZE-THAW TEST

Preparation of Mixtures

In order to minimize the effect of aggregate interlock while maximizing the bond between the aggregate and the asphalt cement, each individual aggregate is first wet sieved to obtain the portion that passes No. 20 sieve and retained on No. 35 sieve (U.S. standard testing sieve series, ASTM E-11). Then 46 g of this aggregate is heated at 160° C. plus or minus 3° C. for at least 2 hours. Three grams of asphalt cement containing 1% by weight of the anti-stripping additive is mixed at 160° C. for 5 minutes. At the appropriate time, the hot aggregate is added to the asphalt and manually mixed as thoroughly and rapidly as possible for 5 minutes. This mixture is then allowed to cool at room temperature for over 30 minutes before compaction of the specimen is begun. The specimen is then compacted by reheating the asphalt concrete mixture at 150° C. for 20 minutes, then transferring the mixture to a steel molding cylinder with a 41.33 mm inside diameter and compacting by applying a constant load of 6200 lbs (2812.32 kg) which corresponds to a force of 27.6 kN for 7 minutes. Generally, 46 g of each individual aggregate will produce a compacted briquet with a uniform height of 19.05 mm, plus or minus 0.127 mm. After compaction, the briquet is extracted from the mold and allowed to cool and cure at room temperature for two days before freeze-thaw cycling.

Test Procedure

The briquet is placed on a cone shaped stress pedestal with only the center of the briquet bottom touching the pedestal. This entire assembly is then placed in a jar with enough distilled water to fill the jar to about one-half inch (12.7 mm) above the test briquet. The jar is then placed in a freezer at a temperature of −12° C. for 15 hours. After this period, the jar is then transferred to a 50° C. oven for 9 hours. At the end of each complete freeze-thaw cycle, the briquet is carefully examined for the appearance of surface cracks. If no cracks are visible, the briquet is subjected to subsequent freeze-thaw cycles until cracks are observed or the test terminated. An additive is considered to pass the freeze-thaw test when the briquet with additive passes more freeze-thaw cycles than the briquet with no additive. A particularly useful additive is one whose briquet passes twenty-five or more freeze-thaw cycles.

TABLE

| RUN NO. | ADDITIVE TYPE | AGGREGATE TYPE | BOIL TEST[1] | FREEZE-THAW TEST[2] |
|---|---|---|---|---|
| A* | None | Gifford-Hill | 40 | 6 |
| B | Ex. 1 | Gifford-Hill | 100 | >30 |
| C | Ex. 2 | Gifford-Hill | 100 | >30 |
| D | Ex. 3 | Gifford-Hill | 100 | >30 |
| E | Ex. 4 | Gifford-Hill | 100 | >30 |
| F* | None | Granite | 90 | 13 |
| G | Ex. 1 | Granite | 100 | 16 |
| H | Ex. 2 | Granite | 100 | 18 |
| I | Ex. 3 | Granite | 100 | 20 |
| J | Ex. 4 | Granite | 100 | 12 |
| K* | None | Helms | 80 | 9 |
| L | Ex. 1 | Helms | 100 | 31 |
| M | Ex. 2 | Helms | 100 | >30 |
| N | Ex. 3 | Helms | 100 | 24 |

TABLE-continued

| RUN NO. | ADDITIVE TYPE | AGGREGATE TYPE | BOIL TEST[1] | FREEZE-THAW TEST[2] |
|---------|---------------|----------------|--------------|---------------------|
| O       | Ex. 4         | Helms          | 100          | 26                  |

*Not an example of the present invention.
[1]Percentage of asphalt remaining on the aggregate after boiling.
[2]The number of freeze-thaw cycles the asphalt concrete withstood before cracking.

Additives that pass the boil and freeze-thaw tests are considered to be useful anti-stripping additives for asphalt. The results in the above table clearly show that the reaction product of a hydrocarbyl substituted nitrogen-containing aromatic heterocyclic material and an amine with an aldehyde are particularly useful antistripping additives for asphalt with either Gifford-Hill, Granite or Helms type aggregates.

We claim:

1. A composition which comprises a blend of
   (A) bituminous material and
   (B) the product resulting from reacting at a temperature sufficient to complete the reaction
      (1) (a) at least one monoamine having a combined total of from about 1 to about 36 carbon, nitrogen, oxygen or sulfur atoms and at least one reactive amine hydrogen atom; (b) at least one polyamine having at least one reactive amine hydrogen atom; or (c) a mixture of (a) and (b);
      (2) at least one aromatic heterocyclic material having one or more rings, at least one heterocyclic nitrogen atom located in the ring and at least one substituent group which has at least one reactive hydrogen atom attached to a heterocyclic ring carbon atom;
      (3) at least one aldehyde, ketone or combination thereof; and
   wherein the components are employed in quantities which provide a mole ratio of (1):(2):(3) of from about 0.25:1:0.25 to about 5:1:5 and the reaction is conducted at a temperature of from about 25° C. to about 250° C. for a time to essentially complete the reaction
   wherein components (A) and (B) are employed in quantities which provide from about 0.05 to about 10 percent by weight of component (B) based upon the combined weight of components (A) and (B).

2. A composition of claim 1 wherein
   (a) component (B-1) is an amine having a combined total of from about 10 to about 20 carbon, nitrogen, oxygen or sulfur atoms and at least one reactive amine hydrogen atom or a mixture of an amine having a combined total of from about 10 to about 20 carbon, nitrogen, oxygen or sulfur atoms and at least one reactive amine hydrogen atom and a polyamine;
   (b) components (B-1), (B-2) and (B-3) are employed in quantites which provide a mole ratio of (B-1):(B-2):(B-3) of from about 1:1:1 to about 2:1:2;
   (c) the reaction is conducted at a temperature of from about 60° C. to about 200° C.; and
   (d) components (A) and (B) are employed in quantities which provide from about 0.25 to about 5 percent by weight of component (B) based upon the combined weight of components (A) and (B).

3. A composition of claim 2 wherein components (A) and (B) are employed in quantities which provide from about 0.5 to about 2.5 percent by weight of component (B) based upon the combined weight of components (A) and (B).

4. A composition of claim 2 wherein component s(A) and (B) are employed in quantities which provide from about 0.5 to about 1.0 percent by weight of component (B) based upon the combined weight of components (A) and (B).

5. A composition of claim 1 wherein
   (a) component (A) is a paving asphalt or a combination of paving asphalts;
   (b) component (B-1) is 1-decanamine, 1-dodecanamine, 1-tetradecanamine, 1-hexadecanamine, 1-octadecanamine, octadecene-1-amine or a mixture thereof, or a mixture of any one or more with triethylenetetramine;
   (c) component (B-2) is 2,4,6-trimethylpyridine, 2,3-dimethylquinoxaline, 2-methyl-5-vinylpyridine or mixtures thereof; and
   (d) component (B-3) is formaldehyde.

6. A composition of claim 2 wherein
   (a) component (A) is a paving asphalt or a combination of paving asphalts;
   (b) component (B-1) is 1-decanamine, 1-dodecanamine, 1-tetradecanamine, 1-hexadecanamine, 1-octadecanamine, octadecene-1-amine or a mixture thereof, or a mixture of any one or more with triethylenetetramine;
   (c) component (B-2) is 2,4,6-trimethylpyridine, 2,3-dimethylquinoxaline, 2-methyl-5-vinylpyridine or mixtures thereof; and
   (d) component (B-3) is formaldehyde.

7. A paving composition comprising a composition of claim 1 and at least one aggregate material.

8. A paving composition of claim 7 wherein the aggregate material is Gifford-Hill, Granite, Helms or a combination thereof.

9. A paving composition comprising a composition of claim 2 and at least one aggregate material.

10. A paving composition of claim 9 wherein the aggregate material is Gifford-Hill, Granite, Helms or a combination thereof.

11. A paving composition comprising a composition of claim 3 and at least one aggregate material.

12. A paving composition of claim 11 wherein the aggregate material is Gifford-Hill, Granite, Helms or a combination thereof.

13. A paving composition comprising a composition of claim 4 and at least one aggregate material.

14. A paving composition of claim 13 wherein the aggregate material is Gifford-Hill, Granite, Helms or a combination thereof.

15. A paving composition comprising a composition of claim 5 and at least one aggregate material.

16. A paving composition of claim 15 wherein the aggregate material is Gifford-Hill, Granite, Helms or a combination thereof.

17. A paving composition comprising a composition of claim 6 and at least one aggregate material.

18. A paving composition of claim 17 wherein the aggregate material is Gifford-Hill, Granite, Helms or a combination thereof.

* * * * *